March 17, 1964  E. LEITZ ETAL  3,125,623
COMBINED VIEW AND RANGE FINDER FOR CAMERAS
Filed July 11, 1960
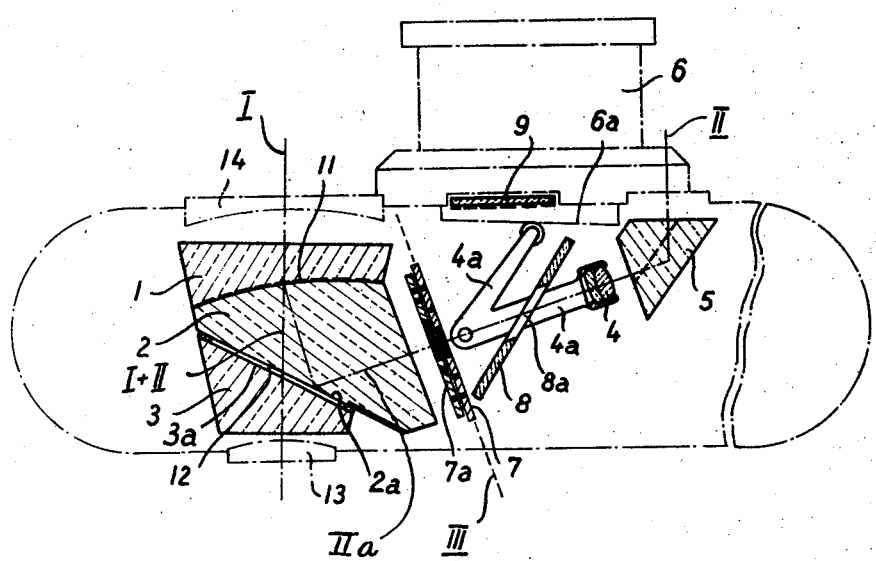
INVENTORS
ERNST LEITZ
WILLI STEIN
BY Toulmin & Toulmin
ATTORNEYS United States Patent Office 3,125,623
Patented Mar. 17, 1964

3,125,623
COMBINED VIEW AND RANGE FINDER FOR CAMERAS
Ernst Leitz and Willi Stein, Wetzlar (Lahn), Germany, assignors to Ernst Leitz, Gesellschaft mit beschrankter Haftung, Wetzlar (Lahn), Germany
Filed July 11, 1960, Ser. No. 41,944
Claims priority, application Germany July 11, 1959
1 Claim. (Cl. 88—2.4)

The present invention relates to measuring range finders for photographic cameras having exchangeable objectives.

It is known to provide view and range finders comprising a telescope producing an intermediate image, and image field boundary means in the plane of the intermediate image, and a beam combining means combining the measuring rays and the image field boundaries into the view finding path of rays. It has also become known to combine a base telemeter with a collimator view finder of the Albada type, wherein the semitransparent collimator mirror is also used as the aforementioned beam combining means. In this known range finder a totally reflecting surface is used reflecting the measuring pencil of rays to the collimator mirror, and which surface is penetrated by the rays reflected by the collimator mirror and by the view finding pencil of rays. The image field boundaries are located in the image plane in the range finder path of rays of a telescope positioned in the view finder path of rays.

The known view and range finders of the aforementioned type require a comparatively great number of optical elements and do not lend themselves to obtain a convenient and favorable pupil position. In addition, the provision of the Albada unit necessitates a rather elongated construction of the entire device, which thus becomes too long for use with small and miniature cameras. Further disadvantages result from the position of the image field boundaries in the finder path of rays, resulting in a poor illumination, as the light is received only through the finder window, and as the illuminating power is further reduced by the semi-transparent collimator mirror; in addition, the reflection power of the image field boundary means may be comparatively small. Still a further disadvantage resides in the fact, that it is not possible to cover those image field boundaries which are not needed in a particular instance so that all image field boundaries appear in the finder field of view, thus creating a confusing view.

These disadvantages are overcome by the combined view and range finder of the present invention wherein a telescope objective producing an intermediate image and image field boundary means in the plane of the intermediate image are positioned in the base path of the measuring rays, and wherein the totally reflecting element as well as the semi-transparent concave mirror are constituted by surfaces of a prison body including an optical mixer and consisting of a plurality of prisons interconnected to each other and disposed in the view finder path of rays.

The invention will be better understood upon the following description of the accompanying drawing which is a schematic view illustrating the improvements of the measuring range finder of the invention.

It will be appreciated that the drawing illustrates only the essential elements and improvements of the view and range finder of the invention. With respect to further details not constituting part of the improvements of the present invention reference is made to the copending applications Ser. No. 736,593 filed on May 20, 1958, and now U.S. Patent 2,960,907, and Ser. No. 835,893 filed on August 25, 1959, and now U.S. Patent 3,029,720, assigned to the same assignee as the instant application.

In the drawing, the invention is shown as comprising a block of three prisms 1, 2, 3 cemented with one another, disposed in the view finder path of rays I, acting as a plano-parallel plate, and forming a beam splitter. A telescope objective 4 and a roof prism 5 are disposed in the base path IIa of the measuring rays II.

The measuring adjustment of the measuring range finder is effected by known structure and in a known manner by displacement of the telescope objective 4 in response to focusing of the camera objective 6, via the control curve 6a and feeler lever 4a. The telescope objective 4 produces an intermediate image in the plane III in which there is disposed a plate 7 bearing image field boundaries. Plate 7 is illuminated through illuminating window 9 and an illuminating mirror 8. The opening 8a also provides a passage for the measuring ray.

It is also possible to provide a displaceable diaphragm plate 7a in front of plate 7. The diaphragm plate has a plurality of slots associated with the various image field boundaries and arranged in staggered relationship with respect to the latter. By displacing the diaphragm plate a particular image field boundary can be selected for transmission; the displacement can be effected depending upon an exchange of objectives with various focal lengths, as known per se. The finder parallax can be compensated by displacing both plates 7 and 7a in their own planes, also known per se.

According to the invention, a semi-transparent concave collimator mirror 11 serving as a beam combining means is associated with prism members 1 and 2, disposed in the range finder path of rays. The semi-transparent concave mirror 11 is formed between contiguous surfaces of prism members 1 and 2. Furthermore, an air gap 12 is defined by the neighboring surfaces of prisms 2 and 3.

The semi-transparent concave minor 11 and the air gap 12 are inclined relative to each other as well as with respect to the view finder axis and to the measuring base rays IIa, so that the path of rays II, IIa of the measuring range finder is totally reflected by surface 2a of prism member 2 towards the semi-transparent mirror 11, which further reflects the light rays so as to become combined with the view finder path of rays I. The combined light rays I, II, are then transmitted through air gap 12 and the surfaces 2a, 3a, of prisms 2, 3, defining the air gap, in the direction of the view finder axis.

Instead of an air gap 12 it is also possible to provide a cemented area between prisms 2 and 3 connecting the prisms with each other; it will be necessary that the index of refraction of this cement area is smaller than the respective indices of refraction of the neighboring prisms 2 and 3.

It is furthermore possible to provide a telescopic view finder by positioning telescope lens members 13 and 14 before and behind beam splitter 1, 2, 3.

It will be noted that the curvature of the semi-transparent concave mirror must be determined according to the imaging requirements of the image field boundaries and the measuring field, as well as according to the imaging scale of the finder telescope 13, 14. The concave mirror may have a spherical curvature, an aspherical curvature, or a toric curvature, or combinations of such curvatures can be provided, of both reflecting surfaces 11 and 2a, so as to compensate image errors such as astigmatism, due to the inclination of the semi-transparent concave mirror 11, at least for the range of the measuring image.

It will be understood that this invention is susceptible to modification in order to adapt it to different usages and conditions and, accordingly, it is desired to comprehend such modifications within this invention as may fall within the scope of the appended claim.

What we claim is:

In a camera having a combined view and range finder to receive and combine an image-viewing-ray and a range-measuring-ray both coming from an object to be photographed, the combination comprising: a roof prism disposed in the path of said range measuring ray from said object for deflecting and partially inverting said measuring ray; a telescopic objective tiltably disposed in the deflected range-measuring-ray path from said roof prism, said telescopic objective forming an image in an intermediate image plane; a viewing field limiting means disposed in said intermediate plane; a first prism disposed in the ray path from said intermediate image plane and having a first lateral surface for entry of rays therefrom into said first prism, said first prism having a second surface in angled relationship to said objective and said intermediate image plane and separating the body of said first prism from a medium of lesser index of refraction so as to cause total reflection of the range-measuring-ray in a forward direction, said first prism having a third, convex surface provided with a semi-transparent mirror layer and orientated to said second surface at such an angle that the range-measuring-ray impinging thereupon is reflected rearwardly thereby and traverses said second surface of said first prism; a second prism having a first, concave surface and a second, plane image-viewing-ray entry surface; means for combining said convex and concave surfaces of said first and second prisms, respectively, with said semi-transparent mirror layer therebetween, said convex surface provided with said semi-transparent mirror layer constituting a collimator mirror for observing said intermediate image plane via said totally reflecting second surface of said first prism; a third prism disposed at the second surface of said first prism and separated therefrom by a gap containing said medium of lesser index of refraction, said third prism having a ray exit surface being parallel to the image-viewing-ray entry surface of the second prism so that the three prisms act as a plano-parallel plate for the image-viewing-ray; said roof prism, said telescopic objective and said second surface of said first prism producing an erect object image of said range-measuring-ray seen via the convex surface provided with said semi-transparent mirror layer; the image-viewing-ray entering the image-viewing-ray entry surface of the second prism and traversing the surface provided with said semi-transparent mirror layer and the gap between the first and the second prism, optically combining with said reflected range-measuring-ray at said semi-transparent mirror layer; the optical axes of said second surface and said third convex surface of said first prism being inclined to each other and to the optical axes of the image-viewing-ray and the range-measuring-ray whereby the optically combined rays from said semi-transparent mirror surface strike said second surface at a non-reflecting angle for passage therethrough; and lens means in the path of said combined rays permitting eye observation thereof.

References Cited in the file of this patent

UNITED STATES PATENTS

| | | |
|---|---|---|
| 2,252,574 | Leitz | Aug. 12, 1941 |
| 2,805,608 | Leitz et al. | Sept. 10, 1957 |
| 2,994,257 | Papke | Aug. 1, 1961 |

FOREIGN PATENTS

| | | |
|---|---|---|
| 910,597 | Germany | May 3, 1954 |
| 545,836 | Great Britain | June 16, 1942 |

OTHER REFERENCES

Stein, German application, 1,023,317, printed January 23, 1958, Kl. 57a 9/05.